Figure 3:
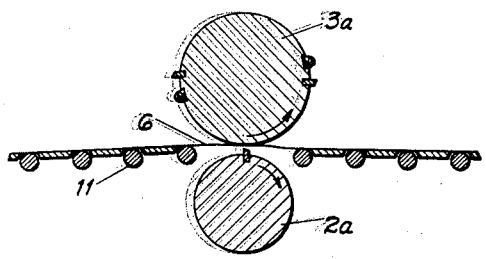

Oct. 27, 1936.    H. H. TALBOT    2,059,187
SHEAR
Filed March 14, 1936    2 Sheets-Sheet 1

INVENTOR
Howard H. Talbot
BY Brown Critchlow & Flick
his ATTORNEYS

Oct. 27, 1936.　　　H. H. TALBOT　　　2,059,187
SHEAR
Filed March 14, 1936　　2 Sheets-Sheet 2
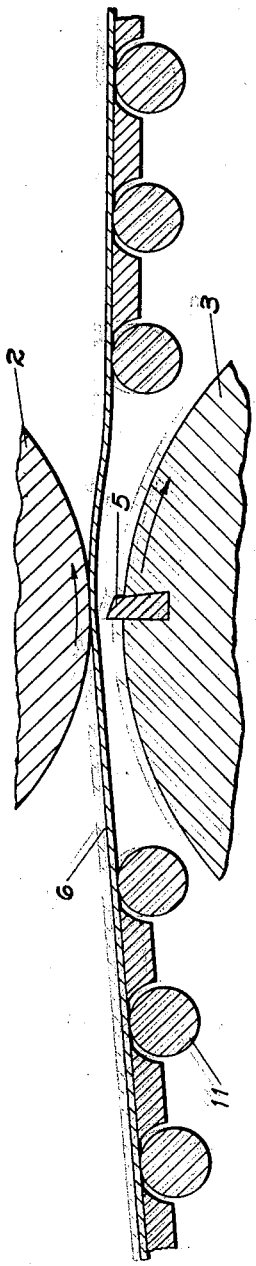
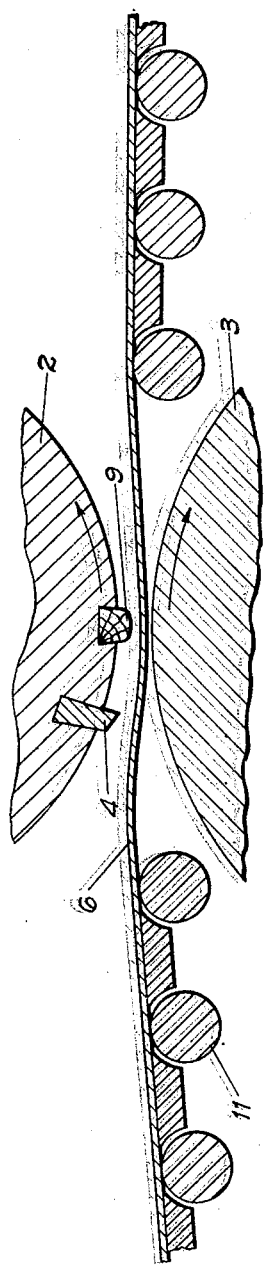
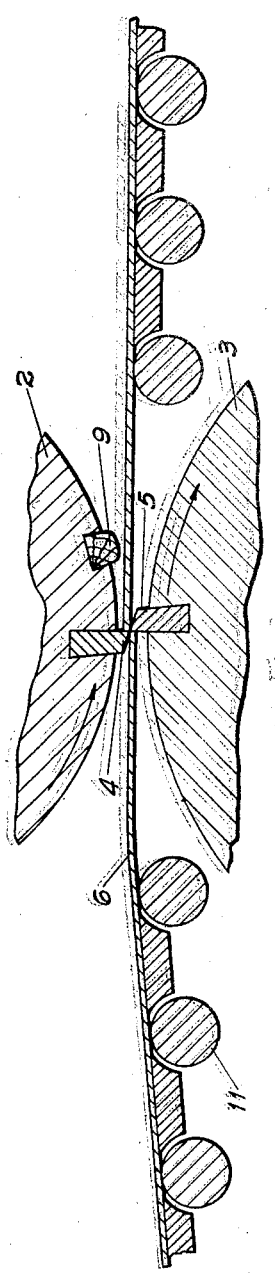
INVENTOR
Howard H. Talbot
BY Brown, Critchlow & Flick
his ATTORNEYS Patented Oct. 27, 1936

2,059,187

UNITED STATES PATENT OFFICE 2,059,187

SHEAR

Howard H. Talbot, Pittsburgh, Pa., assignor to United Engineering & Foundry Company, Pittsburgh, Pa., a corporation of Pennsylvania Application March 14, 1936, Serial No. 68,905

12 Claims. (Cl. 164—66)

This invention relates to an improvement in what is commonly referred to in the cutting art as flying shears, and more particularly to shears of the type in which the cutting blades are supported upon opposed power-driven rotary carriers or drums.

Shears of this kind are employed principally for cutting a moving web into preselected lengths, without interrupting its movement, and to function properly it is desirable that they be able not only to cut a wide variety of lengths, and to do so without damaging or marking the surface of the web between cuts, but also have their cutting blades moving at the instant of cutting at substantially the speed of the web or at a tolerable relative speed. To obtain these objectives such shears have taken many forms. For cutting relatively short lengths it is a rather simple problem to incorporate these features in a shear of this type. To satisfy such requirements the blade carriers or drums can be feasibly designed to produce the cuts required within not more than one revolution, and hence readily operated, within a tolerable range of speed, relative to the speed of the web to vary the length of cuts within the limits required. When the lengths become very large, however, the problem presented becomes somewhat complex because, if the lengths of cuts exceed greatly the circumference of the path of travel of the cutting blades, it is necessary either to stop and start the shear between cuts, separate the carriers between cuts, or so design the carries that they make a plurality of revolutions between cuts. For most purposes the latter type of shear is preferred. In shears of this type, however, especially where used in the metal working art towards which this invention is more particularly directed, the cutting blades will strike and damage the surface of the strip between the cuts unless provision is made to prevent such action. To overcome this difficulty some shears of this kind are provided in which the cutting blades are rotated or otherwise moved with respect to the carriers so that they will not engage the web except when it is desired to produce a cut. Such construction, however, especially in heavy metal shears, is usually undesirable and for many purposes impractical because of the operating instrumentalities which it requires.

With the aforementioned problems in mind it is an object of this invention to provide in a rotary shear, and especially a rotary shear of the drum type, in which the carriers are adapted to be revolved a plurality of times between cuts for preventing the blades marking or damaging the web between cuts, and for doing so without disturbing either the axis of rotation of the carriers or the permanent mounting of the cutting blades.

Figure 1:
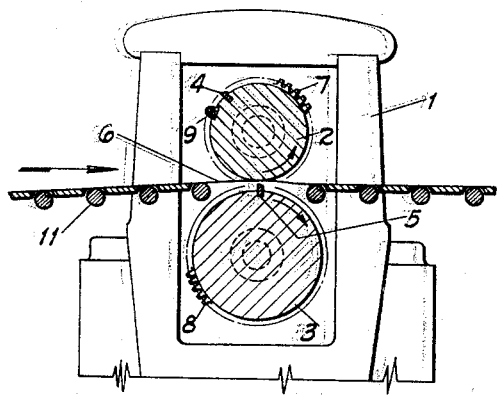
Figure 2:
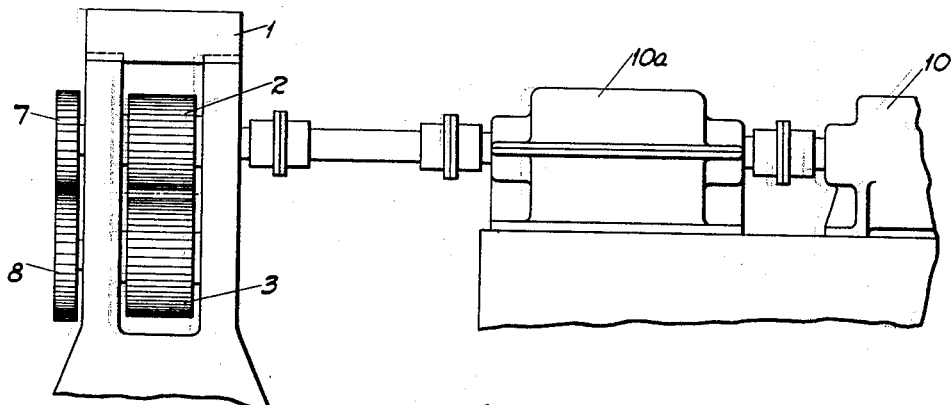

This and various other objects as well as the various other novel features and advantages of the invention will be apparent when the following detailed description is read in conjunction with the accompanying drawings in which Fig. 1 is a sectional view of a shear constructed in accordance with the invention for cutting metal strip; Fig. 2 an end elevation of the shear shown in Fig. 1; Fig. 3 a diagrammatic view of a modified form of the invention; and Figs. 4, 5 and 6 enlarged views showing the conditions obtained with the use of this invention.

Referring in detail to the drawings, and first more particularly to the embodiment of the invention illustrated in Figs. 1, 2, 4, 5 and 6, the numeral 1 designates a shear housing and the numerals 2 and 3 a pair of blade carriers or drums which are suitably mounted in the housing for rotation about fixed axes. As shown, these drums are of different diameters and are provided with a pair of cooperating transversely extending cutting blades 4 and 5, respectively, which are adapted to sever the strip or web 6 into predetermined lengths when they are brought into cutting opposition as the strip is passed between them.

In this particular embodiment of the invention let it be assumed that the drums 2 and 3 are made of different diameters which bear the relation of 3:4 to each other, and that they are geared together by suitable gears 7 and 8 which cause them to rotate at the same peripheral speeds. This insures the cutting blades being brought together on each fourth revolution of the upper drum 2 and on each third revolution of the lower drum 3. Consequently, if operated to have a peripheral speed equal to the lineal speed of the web, they will produce cuts equal to four times the circumference of the path of travel of the upper blade or three times the circumference of the path of travel of the lower blade. In other words, the upper blade 4 is adapted to pass over the strip three times between each cut while the lower blade 5 passes under the strip twice between each cut.

With such an arrangement it has been found very difficult and practically impossible to guide the strip between the two drums without the edges of the top and bottom knives alternately striking the strip and seriously marking it. This marking is prevalent in both hot and cold shearing and when hot shearing, i. e., when shearing strip as it is delivered by a continuous hot strip mill which has a temperature of about 1400° F., the marking is at times so great as to render the coil unfit for the purpose for which it was intended.

Assuming that the top and bottom drums have a diametric ratio of 3:4 respectively, each time the bottom knife passes its strip marking position, as shown in Fig. 1, the top knife is at least 120° from its corresponding position; likewise, when the top knife is passing its strip marking position, the bottom knife is at least 90° away from the strip. This fact is taken advantage of, in the practice of this invention, as will be apparent to those skilled in the art after a further study of the description.

In accordance with this invention, to avoid detrimental marking of the strip, table 11 is adjusted at an angle to the horizontal to guide the strip through the shear in such a manner that it is normally urged against the top drum 2 and therefore out of the path of the bottom knife 5. To avoid contact with the strip by the top knife, there is provided deflecting block 9 mounted on and projecting from the top drum 2 slightly in advance of and parallel to the top knife 4. This block 9 is made of any suitable material such as wood or soft metal and provided with a blunt strip engaging surface. The purpose of this block 9 is to engage the strip and temporarily deflect it out of its normal path and away from the top knife 4 and against the bottom drum 3, the distance between the top knife 4 and the bottom drum 3 being sufficiently great to permit passage of the strip. The block 9 is, of course, given the necessary height and spaced the proper distance from the blade to properly perform its function, and by virtue of the speed of the strip and shear, the strip will not return to its original line of travel until the knife is safely past its strip marking position. These dimensions, as will be apparent, may vary somewhat for different sized drums and for drums which are operated at different speeds. It is to be understood that the block 9 may, if desired, be integral with and of the same material as the drum.

While the blade carriers are illustrated in the form of drums, it is to be understood that any suitable shape of carrier may be employed which will properly support the cutting blades and the deflecting rib, and that any suitable drive may be employed for operating them, such as a motor 10 coupled through a drive 10a to the shaft of the upper blade carrier 2, it in turn being operably connected to the lower carrier by the gears 7 and 8.

The embodiment of the invention shown in Fig. 3 differs from that described in connection with Figs. 1 and 2 only in that the drums have been inverted and two blades have been shown on the larger drum instead of one. With the same drum diameter and diametric ratio, this arrangement would permit the shearing of lengths one-half as long as those which could be sheared by the arrangement shown in Fig. 1, i. e., a cut would be made every second revolution of the lower drum 2a and every one and one-half revolutions of the upper drum 3a.

It will be obvious from the foregoing that the strip may be guided against the periphery of the bottom drum instead of against the top drum, in which case the deflecting block would be mounted on the bottom drum in advance of the knife, and I wish to have it understood that the strip may be guided at random through the shear and a deflecting block mounted on both drums in advance of the knives.

According to the provisions of the patent statutes, I have explained the principle and mode of operation of my invention, and have illustrated and described what I now consider to be its best embodiment. However, I desire to have it understood that, within the scope of the appended claims, the invention may be practiced otherwise than as specifically illustrated and described.

I claim:

1. In a flying shear, a rotary blade carrier equipped with a cutting blade positioned to intersect the normal path of travel of the material through the shear each time it is rotated through a complete revolution, and means mounted on said carrier in a position to engage the material ahead of the cutting blade as the carrier is rotated and deflect the material away from the blade so that the blade will not strike the material except when a cut is being made.

2. A flying shear comprising a pair of blade carriers of different radii equipped with cutting blades, means for causing at least one of said carriers to make a plurality of revolutions between cuts, and means mounted in advance of the blade on the latter carrier for striking the material to be cut and deflecting it out of the way of said blade each time said carrier is rotated.

3. A flying shear comprising a pair of rotatable blade carriers, a cutting blade on each of said carriers, means for so rotating said carriers as to bring said cutting blades into cutting opposition only after a plurality of revolutions of both carriers, and means for deflecting the material to be cut away from the cutting blades between cuts.

4. A flying shear comprising a pair of rotatable blade carriers, a cutting blade on each of said carriers, means for so rotating said carriers as to bring said cutting blades into cutting opposition only after a plurality of revolutions of at least one of said carriers, and means for deflecting the material to be cut away from the cutting blades between cuts.

5. A flying shear comprising a pair of rotatable blade carriers, a cutting blade on each of said carriers, one of said carriers being positioned with respect to the path of travel of the material therebetween so that it will not intersect the material except when a cut is being made, means on the other carrier for deflecting the material away from the cutting blade thereon as it is revolved through the normal path of travel of the material, and means for causing said cutting blades to be brought into cutting opposition with each other only after a plurality of revolutions of both carriers.

6. A flying shear comprising an upper and lower blade supporting drum of different diameters, a cutting blade on each drum, means for supporting and delivering material through said shear along a plane which is tangential to the periphery of one of said drums and which is not intersected by the blade on the other drum in its path of travel, and means on the drum disposed tangentially to the path of travel of the material for deflecting the material away from the blade thereon when said carrier is revolved.

7. A flying shear, a pair of drums equipped with projecting cutting blades, means for guiding the material to be cut against the periphery of one of said drums, and means mounted on said latter drum for deflecting the material away from said drum just prior to the approach of said projecting knife.

8. A flying shear for cutting moving material comprising a pair of rotating knives, means for guiding the material through the shear in a plane intersecting the path of travel of one of said knives, and means for deflecting said material out of said path just prior to the approach of said latter knife.

9. A flying shear for cutting strip material or the like comprising a pair of rotating knives, means for guiding the material through the shear in a plane intersecting the path of travel of one of said knives, and means for deflecting said material entirely out of said path and into the path of the other knife just prior to the approach of said first-mentioned knife.

10. A flying shear for cutting moving material comprising a pair of rotatable blade carriers, a cutting blade mounted on each of said carriers, and a material deflecting member mounted on each of said carriers in advance of the cutting blade.

11. A flying shear, a pair of superposed drums equipped with projecting cutting blades, means for guiding the material to be cut against the periphery of the top drum, and means mounted on said top drum for deflecting the material away from said drum just prior to the approach of its projecting knife into cutting position.

12. A flying shear comprising a pair of blade carriers of different radii equipped with cutting blades, means for causing at least one of said carriers to make a plurality of revolutions between cuts, and a rib which is extended across the length of the latter carrier mounted on the periphery thereof in advance of the cutting blade thereon for striking the material as it passes through the shear and deflecting it out of the way of said blade each time said carrier is rotated.

HOWARD H. TALBOT.